United States Patent Office 2,933,494
Patented Apr. 19, 1960

2,933,494

DIAZO PREGNANE COMPOUNDS AND METHOD OF PREPARING SAME

Burton G. Christensen, Rahway, and Ralph F. Hirschmann, Scotch Plains, N.J., assignors to Merck & Co., Inc., Rahway, N.J., a corporation of New Jersey No Drawing. Application January 27, 1958
Serial No. 711,132

20 Claims. (Cl. 260—239.55)

This invention generally relates to new steroid compounds. More particularly, it is concerned with new steroids which have a diazo substituent at the C-21 position. Still more particularly, it is concerned with 17α-hydroxy-20-keto-21-diazo steroids of the pregnane series, and with methods for making such new compounds.

Heretofore, no methods have been known or available for making 21-diazo steroids of the pregnane series having a hydroxy substituent attached to the number 17 carbon atom. The methods which had been previously developed for making certain C-21 diazo steroids were not suitable or applicable when the steroid contained a 17α-hydroxy group.

It is an object of our invention to provide a novel synthesis of 17α-hydroxy-21-diazo steroids. More particularly, an object of our invention is a synthesis of such steroids from 17α-hydroxy-21-aldehydo steroids of the pregnane series. An additional and equally important object is the provision for the first time of 17α-hydroxy-20-keto-21-diazo steroids of the pregnane series. A still further and more specific object is the provision of such new compounds which are unsaturated in the 1:2 and/or 4:5 positions of the steroid molecule and which are oxygenated at the 11 position. Other objects will be apparent from the detailed discussion of the invention hereinbelow.

We have now found that 17α-hydroxy-20-keto-21-diazo steroids may be prepared from a 17α-hydroxy-21-aldehydo steroid by treatment of the latter compound with hydrazine, thereby forming the hydrazone of the steroid 21-aldehyde and oxidizing said hydrazone with mercuric oxide. As applied to the preferred compounds of this invention, i.e. pregnanes unsaturated in ring A and oxygenated at C-11, our process and the new compounds produced thereby may be pictured structurally as follows:

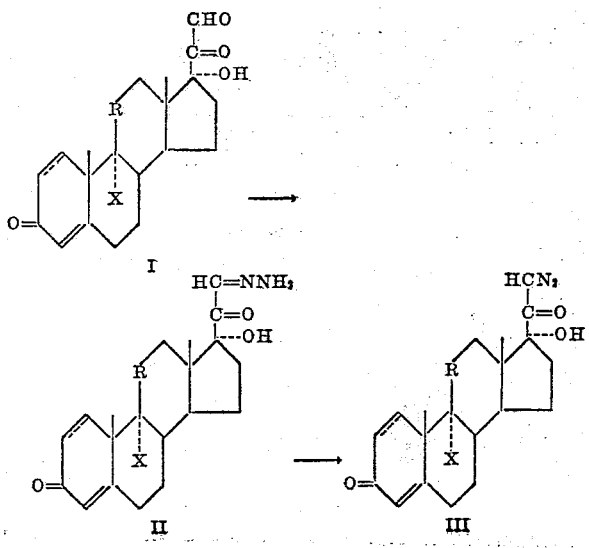

In the above structural formulae, R may be >C=O or

and X may be hydrogen or a halogen. The broken line between the 1 and 2 carbons indicates that the position may be saturated or unsaturated.

The new compounds of our invention, and particularly those illustrated in Formula III above are useful in that they possess cortisone-like anti-inflammatory activity. In addition, the 17α-hydroxy-21-diazo steroids are converted by treatment with phosphoric acid to the corresponding 17,21-oxido-20-keto steroids which also have cortisone-like anti-inflammatory activity. The hydrazones of Formula II above are important in that they are new intermediates in the synthesis of our new 21-diazo compounds.

According to our process, the hydrazones of Formula II are prepared by treating an aldehyde of Formula I with hydrazine. The reaction is preferably carried out at an elevated temperature in an aqueous polar solvent such as a lower alkanol, tetrahydrofuran and the like. Formation of the hydrazine occurs very promptly after addition of the hydrazone, and heating for a short period of time followed by cooling to room temperature or below is sufficient to cause crystallization of the desired product. The aldehyde starting material is preferably charged to the reaction mixture as the hydrate.

The second step of our process, oxidation of the hydrazone to a 17α-hydroxy-20-keto-21-diazo steroid of the pregnane series, is brought about by treating the hydrazone with mercuric oxide in the presence of a small amount of base. While the reaction will take place in the absence of a base, it goes much more promptly and satisfactorily when a base is present and this aspect represents a preferred embodiment of the process. The particular base employed is not critical, and alkali metal hydroxides such as sodium or potassium hydroxide or alkaline earth metal hydroxides are satisfactory. Normally only a very small quantity of alkali is required since it is necessary only to have the reaction mixture at a basic pH. The oxidation is preferably carried out in an inert organic solvent medium such as tetrahydrofuran, dioxane, ether and similar solvents. It is desirable, although not necessary, to have present in the reaction mixture a small amount of a drying agent such as anhydrous sodium sulfate, magnesium sulfate, and the like. The resulting 21-diazo steroid may be recovered from the reaction mixture by removal of the reaction solvents and is conveniently purified, if desired, by methods such as recrystallization and/or chromatography on adsorbents such as cellulose.

The preferred compounds of this invention are those 17α-hydroxy-20-keto-21-diazo steroids of the pregnane series which are oxygenated at the 11-position and which are also unsaturated in the A ring of the steroid nucleus. There may be a double bond at the 4:5-position and also at the 1:2-position of the A ring. Also preferred are the hydrazones which are key intermediates in the synthesis of such compounds. It will be appreciated that the 17α-hydroxy-20-keto-21-diazo steroids, and the hydrazone precursors thereof, may also be unsaturated or contain substituents in other portions of the condensed ring nucleus. Thus, there may be a halogen atom, such as chlorine, bromine or fluorine, at the 9α-position and 9α-fluoro steroids represent one of the preferred types of 21-diazo compounds.

The 21-diazo steroids of the pregnane series obtained according to our invention may be converted to 17,21-oxido steroids of the general formula

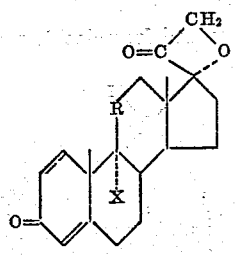

wherein R and X are as defined above, by treatment with phosphoric acid.

The starting materials for our process, i.e. 17α-hydroxy-20-keto-21-aldehydo steroids of the pregnane series, are obtained by oxidizing the corresponding 21-ol steroid with copper acetate as described in United States Patent Numbers 2,773,077 and 2,773,078.

The following examples are given for purposes of illustration and not by way of limitation:

*Example 1*

One gram of 11β,17α-dihydroxy-Δ$^{1,4}$-pregnadien-3,20-dione-21-al-hydrate is dissolved in boiling ethanol and 40 ml. of water is added to this solution. The mixture is allowed to cool to room temperature and 0.13 ml. of hydrazine hydrate is added. The resulting solution is mixed thoroughly and then heated to boiling momentarily. It is then allowed to cool slowly to room temperature, chilled in an ice bath and then the resulting product filtered. The 21-hydrazone of 11β,17α-dihydroxy - Δ$^{1,4}$ - pregnadien-3,20-dione-21-al thus obtained melts at 213–215° C.

The starting material for the reaction described above is obtained in the following manner: 18.5 grams of 11β,17α,21-trihydroxy-Δ$^{1,4}$-pregnadiene-3,20-dione in 750 ml. of methanol is warmed to the reflux temperature. To the hot solution is added 23 grams of copper acetate in 180 ml. of water and 725 ml. of methanol. The resulting mixture is refluxed for 30 minutes, 10 grams of decolorizing charcoal is then added to the hot solution, and the solution filtered through a filter-aid cake. The clear filtrate is chilled whereupon crystals of 11β,17α-dihydroxy-Δ$^{1,4}$-pregnadien-3,20-dione-21-al are deposited. The crystalline material is recovered by filtration and dried in vacuo.

*Example 2*

One gram of the 21-hydrazone of 11β,17α-dihydroxy-Δ$^{1,4}$-pregnadien-3,20-dione-21-al is mixed with 1.2 grams of mercuric oxide and 0.13 grams of anhydrous sodium sulfate in 25 ml. of tetrahydrofuran. Two drops of a cold saturated alcoholic solution of potassium hydroxide is added and the reaction mixture shaken periodically for eight hours. At the end of this time any solid material is removed by filtration and the red filtrate evaporated to dryness in vacuo. There is obtained in this manner 21-diazo-11β,17α-dihydroxy-Δ$^{1,4}$-pregnadiene-3,20-dione, melting at 93–96° C.

*Example 3*

By treating one gram of 17α-hydroxy-Δ$^{1,4}$-pregnadien-3,11,20-trione-21-al with hydrazine hydrate in a manner described in Example 1, and oxidizing the resulting hydrazone with mercuric oxide by the procedure of Example 2, there is obtained 21-diazo-17α-hydroxy-Δ$^{1,4}$-pregnadiene-3,11,20-trione.

*Example 4*

One gram of 9α-fluoro-11β,17α-dihydroxy-Δ$^{1,4}$-pregnadien-3,20-dione-21-al is dissolved in 20 ml. of ethanol. To this solution is added 40 ml. of water and 0.13 ml. of hydrazine hydrate. The resulting mixture is heated to boiling and then cooled to 0° C. The 21-hydrazone of 9α-fluoro-11β,17α-dihydroxy-Δ$^{1,4}$ - pregnadien - 3,20-dione-21-al precipitates on cooling and is isolated by filtration.

The aldehyde employed as starting material in this example is obtained by treatment of a refluxing solution of 2.25 grams of 9α-fluoro-11β,17α,21-trihydroxy-Δ$^{1,4}$-pregnadiene-3,20-dione in 30 ml. of methanol with a hot solution of 2.64 grams of copper acetate, 30 ml. of water and 83 ml. of methanol. The resulting mixture is refluxed for 20 minutes, treated with decolorizing charcoal and filtered. Upon cooling of the filtrate 9α-fluoro-11β,17α - dihydroxy-Δ$^{1,4}$-pregnadien-3,20-dione-21-al precipitates.

*Example 5*

To a mixture of 75 mg. of the 21-hydrazone of 9α-fluoro-11β,17α-dihydroxy-Δ$^{1,4}$-pregnadien-3,20-dione - 21-al, 150 mg. of yellow mercuric oxide and 30 mg. of anhydrous sodium sulfate is added 5 ml. of tetrahydrofuran and one drop of a saturated alcoholic potassium hydroxide solution. The resulting mixture is shaken for 25 minutes, filtered and evaporated to dryness in vacuo. There is thus obtained 21-diazo-9α-fluoro-11β,17α-dihydroxy-Δ$^{1,4}$-pregnadiene-3,20-dione.

*Example 6*

180 ml. of water is added to a hot solution of 3.15 grams of 9α-fluoro-11β,17α-dihydroxy-Δ$^4$-pregnen-3,20-dione-21-al in 60 ml. of ethanol, and the resulting solution allowed to cool at 35° C. 0.39 ml. of hydrazine hydrate is then added with stirring and the mixture warmed to 80° C. The 21-hydrazone of 9α-fluoro-11β,17α - dihydroxy-Δ$^4$-pregnen-3,20-dione-21-al crystallizes spontaneously. It is recovered by cooling the reaction mixture to room temperature and filtering. It melts at 225–226° C.

The aldehyde employed in the above reaction is obtained by treating a hot methanolic solution of 9α-fluoro-11β,17α,21-trihydroxy-Δ$^4$-pregnene-3,20-dione with an aqueous methanolic solution of copper acetate under the conditions described in Examples 1 and 4 for similar compounds.

*Example 7*

A mixture of the hydrazone obtained by the method of Example 6, 1.64 grams of yellow mercuric oxide, 0.43 gram of anhydrous sodium sulfate, 34.2 ml. of dry tetrahydrofuran and 0.35 ml. of saturated alcoholic potassium hydroxide is stirred at room temperature for 24 hours. Any solid present is removed by filtration. 21-diazo-9α-fluoro-11β,17α-dihydroxy-Δ$^4$-pregnene-3,20-dione is recovered from the filtrate by concentrating said filtrate to dryness in vacuo on a steam bath.

*Example 8*

Following the procedure set forth in Examples 1 and 2 above and starting with one gram of 17α-hydroxy-Δ$^4$-pregnen-3,11,20-trione-21-al, there is obtained consecutively the 21-hydrazone of said aldehyde and, upon oxidation of the hydrazone with mercuric oxide, 21-diazo-17α-hydroxy-Δ$^4$-pregnene-3,11,20-trione.

*Example 9*

A mixture of 250 mg. of 21-diazo-11β,17α-dihydroxy-Δ$^{1,4}$-pregnadiene-3,20-dione, 5 ml. of dioxane and 1 ml. of 85% phosphoric acid is heated on the steam bath for a few minutes. The mixture is then allowed to stand overnight at about room temperature. It is then poured into water and the resulting aqueous solution extracted with chloroform three times. The combined chloroform extracts are washed with 5% sodium bicarbonate and with water, and then dried over anhydrous sodium sulfate.

The chloroform is removed and the residual material extracted with acetone-petroleum ether. This extract is concentrated to dryness in vacuo and the residual material dissolved in a 9:1 mixture of benzene-chloroform. The solution is chromatographed on 8 grams of aluminum oxide and eluted with benzene-chloroform. On elution of the column with a 4:1 mixture of benzene-chloroform 17,21 - oxido - 11β - hydroxy-Δ¹,⁴-pregnadiene-3,20-dione is obtained in the eluate, melting point 242–244° C.

The other 21-diazo-17α-hydroxy-20-keto steroids of this invention are converted to the corresponding 17,21-oxido compounds by treatment with phosphoric acid in the manner described in the preceding paragraph.

Any departure from the above description which conforms to the present invention is intended to be included within the scope of the claims.

What is claimed is:

1. A compound having the formula

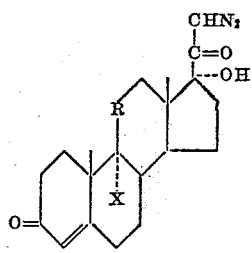

where R is selected from the class consisting of >C=O and

and X is selected from the class consisting of hydrogen and halogen when R is

and is halogen when R is >C=O.

2. A compound having the formula

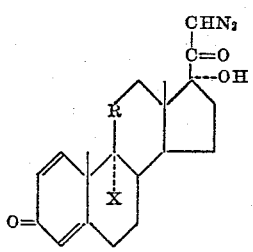

where R is selected from the class consisting of >C=O and

and X is selected from the class consisting of hydrogen and halogen.

3. 21 - diazo-11β,17α-dihydroxy-Δ¹,⁴-pregnadiene-3,20-dione.

4. 21 - diazo-9α-fluoro-11β,17α-dihydroxy-Δ¹,⁴-pregnadiene-3,20-dione.

5. 21 - diazo-9α-fluoro-11β,17α-dihydroxy-Δ⁴-pregnene-3,20-dione.

6. 21 - diazo - 17α - hydroxy-Δ¹,⁴-pregnadiene-3,11,20-trione.

7. The process which comprises treating the 21-hydrazone of 11β,17α - dihydroxy-Δ¹,⁴-pregnadiene-3,20-dione-21-al with mercuric oxide in the presence of a base thereby forming 21-diazo-11β,17α-dihydroxy-Δ¹,⁴-pregnadiene-3,20-dione.

8. The process which comprises treating the 21-hydrazone of 9α-fluoro-11β,17α-dihydroxy-Δ¹,⁴-pregnadien-3,20-dione-21-al with mercuric oxide in the presence of a base thereby forming 21-diazo-9α-fluoro-11β,17α-dihydroxy-Δ¹,⁴-pregnadiene-3,20-dione.

9. The process which comprises treating the 21-hydrazone of 9α-fluoro-11β,17α-dihydroxy-Δ⁴-pregnen-3,20-dione-21-al with mercuric oxide in the presence of a base thereby forming 21-diazo-9α-fluoro-11β,17α-dihydroxy-Δ⁴-pregnene-3,20-dione.

10. A compound having the formula

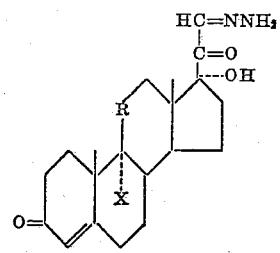

where R is selected from the class consisting of >C=O and

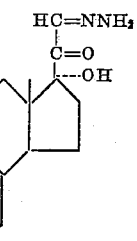

and X is selected from the class consisting of hydrogen and halogen.

11. A compound having the formula

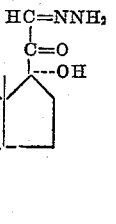

where R is selected from the class consisting of >C=O and

and X is selected from the class consisting of hydrogen and halogen.

12. The 21 - hydrazone of 11β,17α-dihydroxy-Δ¹,⁴-pregnadien-3,20-dione-21-al.

13. The 21-hydrazone of 9α-fluoro-11β,17α-dihydroxy-Δ¹,⁴-pregnadien-3,20-dione-21-al.

14. The 21-hydrazone of 9α-fluoro-11β,17α-dihydroxy-Δ⁴-pregnen-3,20-dione-21-al.

15. The process which comprises treating 11β,17α-dihydroxy-Δ¹,⁴-pregnadien-3,20-dione-21-al with hydrazine thereby forming the C-21-hydrazone thereof.

16. The process which comprises treating 9α-fluoro-11β,17α-dihydroxy-Δ⁴-pregnen-3,20-dione-21-al with hydrazine thereby forming the C-21-hydrazone thereof.

17. The process which comprises treating 21-diazo-11β,17α-dihydroxy-Δ¹,⁴-pregnadiene-3,20-dione with phosphoric acid thereby producing 17,21-oxido-11β-hydroxy-Δ¹,⁴-pregnadiene-3,20-dione.

18. The process which comprises treating a member of the group consisting of a steroid of the formula

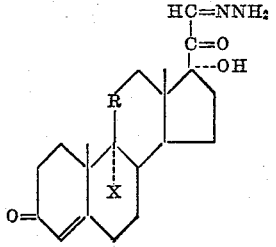

and the Δ' derivative thereof, wherein R is selected from the class consisting of >C=O

and X is selected from the class consisting of hydrogen and halogen with mercuric oxide in the presence of a base to produce the corresponding 21-diazo steroid.

19. The process which comprises treating a member of the group consisting of a steroid of the formula

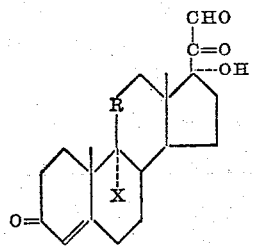

and the Δ' derivative thereof, wherein R is selected from the class consisting of >C=O

and X is selected from the class consisting of hydrogen and halogen with hydrazine to produce the C-21 hydrazone thereof.

20. The process which comprises treating a member of the group consisting of a steroid of the formula

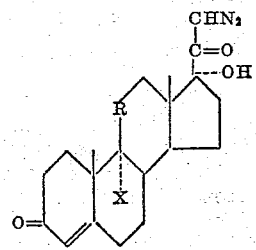

and the Δ' derivative thereof, wherein R is selected from the class consisting of >C=O

and X is selected from the class consisting of hydrogen and halogen with phosphoric acid to produce the 17,21-oxide thereof.

References Cited in the file of this patent
UNITED STATES PATENTS

| | | |
|---|---|---|
| 2,648,688 | Minlon et al. | Aug. 11, 1953 |
| 2,673,863 | Miescher et al. | Mar. 30, 1954 |